(12) United States Patent
Curless et al.

(10) Patent No.: US 12,373,266 B2
(45) Date of Patent: Jul. 29, 2025

(54) APPLICATION RELAUNCH OPTIMIZATION

(71) Applicant: Apple Inc., Cupertino, CA (US)

(72) Inventors: Jeffrey D. Curless, Cupertino, CA (US); Rohit Mundra, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 17/898,118

(22) Filed: Aug. 29, 2022

(65) Prior Publication Data

US 2023/0393910 A1  Dec. 7, 2023

Related U.S. Application Data

(60) Provisional application No. 63/348,254, filed on Jun. 2, 2022.

(51) Int. Cl.
*G06F 9/06* (2006.01)
*G06F 9/451* (2018.01)
*G06F 9/54* (2006.01)

(52) U.S. Cl.
CPC ............. *G06F 9/542* (2013.01); *G06F 9/451* (2018.02)

(58) Field of Classification Search
CPC ................................ G06F 9/542; G06F 9/451
See application file for complete search history.

(56) References Cited

U.S. PATENT DOCUMENTS

| | | | | |
|---|---|---|---|---|
| 9,361,150 | B2* | 6/2016 | Srour | G06F 9/46 |
| 9,788,160 | B1* | 10/2017 | Gu | H04W 4/021 |
| 10,223,156 | B2* | 3/2019 | Chan | G06F 1/3206 |
| 11,494,231 | B2* | 11/2022 | Lee | G06F 9/4843 |
| 2013/0054908 | A1* | 2/2013 | Gehani | G06F 9/4493 |
| | | | | 711/161 |
| 2013/0067474 | A1* | 3/2013 | Edmonds | G06F 9/485 |
| | | | | 718/100 |
| 2014/0366042 | A1* | 12/2014 | Chan | G06F 1/3212 |
| | | | | 719/318 |
| 2017/0048333 | A1* | 2/2017 | Zhong | G06F 1/329 |

* cited by examiner

*Primary Examiner* — Kevin L Young
*Assistant Examiner* — Abdou K Seye
(74) *Attorney, Agent, or Firm* — Kilpatrick Townsend & Stockton LLP

(57) ABSTRACT

Certain embodiments disclosed herein provide application relaunch optimization. Aspects of the present disclosure include deferring the termination of at least some applications notwithstanding an action taken by the user to terminate such applications. For example, a trigger event such as a deferral time can be set, prior to which the termination will take place if an additional user action occurs, and after which the application will be kept suspended in volatile memory indefinitely. As another example, the termination can take place, or not, depending on the type of application or the nature of its usage. An application that has not been terminated despite the termination action being taken by the user and the application's removal from the application management interface can be invoked quickly and efficiently, improving the user experience.

20 Claims, 7 Drawing Sheets

APPLICATION RELAUNCH OPTIMIZATION

CROSS-REFERENCE TO RELATED APPLICATION

This application claims the benefit of U.S. Provisional Application No. 63/348,254 filed Jun. 2, 2022, entitled "Application Relaunch Optimization." The disclosure of this application is incorporated by reference herein in its entirety.

BACKGROUND

Many users of computing devices routinely and actively use many applications over relatively brief periods of time. In order to provide the best possible user experience, an operating system may keep recently-used applications resident in volatile memory ("memory," typically RAM) so that when the user returns to using such an application, the application relaunches seemingly immediately or near immediately, relative to how long it takes the application to initially launch after powering or restarting the device, or to launch from persistent (non-volatile) storage ("disk" or "flash").

The operating system of a computing device (e.g., a phone) can provide a way for a user to visually determine which of many installed applications have been recently used by activating an application management interface, commonly referred to as a "task manager," "app switcher" or "app manager." The application management interface can also provide a way for a user to quickly terminate an application in the event that the application has encountered an error, or when the user simply wishes to quickly return the application to its startup state by terminating and relaunching the application. Terminating an application in such a circumstance is sometimes referred to, for example, as "ending," "killing," "force quitting" or "force stopping" the application.

Many users often terminate applications for other reasons. As one example, the user may terminate applications simply to clean up or simplify the aesthetic appearance of the application management interface. As another example, a user of a computing device may terminate applications that have not been recently used in the belief that doing so will improve the device's performance. However, with modern operating systems, the performance improvement from terminating applications is often imperceptible or non-existent. Further, relaunching an application from persistent storage in order to use the application is often slow and computationally inefficient as compared to accessing the same application from a suspended state in volatile memory. It is desirable to more closely manage the termination and relaunching of applications installed on a computing device.

BRIEF SUMMARY

Aspects of the present disclosure include methods for providing application relaunch optimization. These techniques improve overall computing device performance by deferring the termination of at least some applications notwithstanding an action taken by the user to terminate such applications. For example, a trigger event can be set, prior to which the termination will take place if an additional user action occurs, and after which the application will be kept suspended in volatile memory indefinitely unless the application needs to be purged due to performance issues or other memory management considerations. As another example, the termination can take place, or not, depending on the type of application or the nature of its usage.

An application that has not been terminated despite the termination action being taken by the user and the application's removal from the application management interface can be invoked quickly and efficiently, improving the overall user experience.

As an example embodiment, a method includes detecting, by one or more processors of a computing device, a termination input for an application in volatile memory. The method further includes transitioning the application to a suspended state in the volatile memory in response to the termination input. The method also includes selectively terminating and relaunching the application based on an invocation input for the application occurring prior to a trigger event. The method additionally includes, selectively activating the application from the suspended state based on the invocation input occurring after the trigger event.

Another aspect of the present disclosure includes a system further including the one or more processors and a memory that includes instructions that when executed by the one or more processors, cause the one or more processors to perform one or more methods as described above.

Other aspects of the present disclosure include a non-transitory computer-readable medium, that stores instructions that, when executed by one or more processors, cause the one or more processors to perform the methods described above.

A better understanding of the nature and advantages of embodiments of the present disclosure may be gained with reference to the following detailed description and the accompanying drawings.

DETAILED DESCRIPTION

Figure 1:
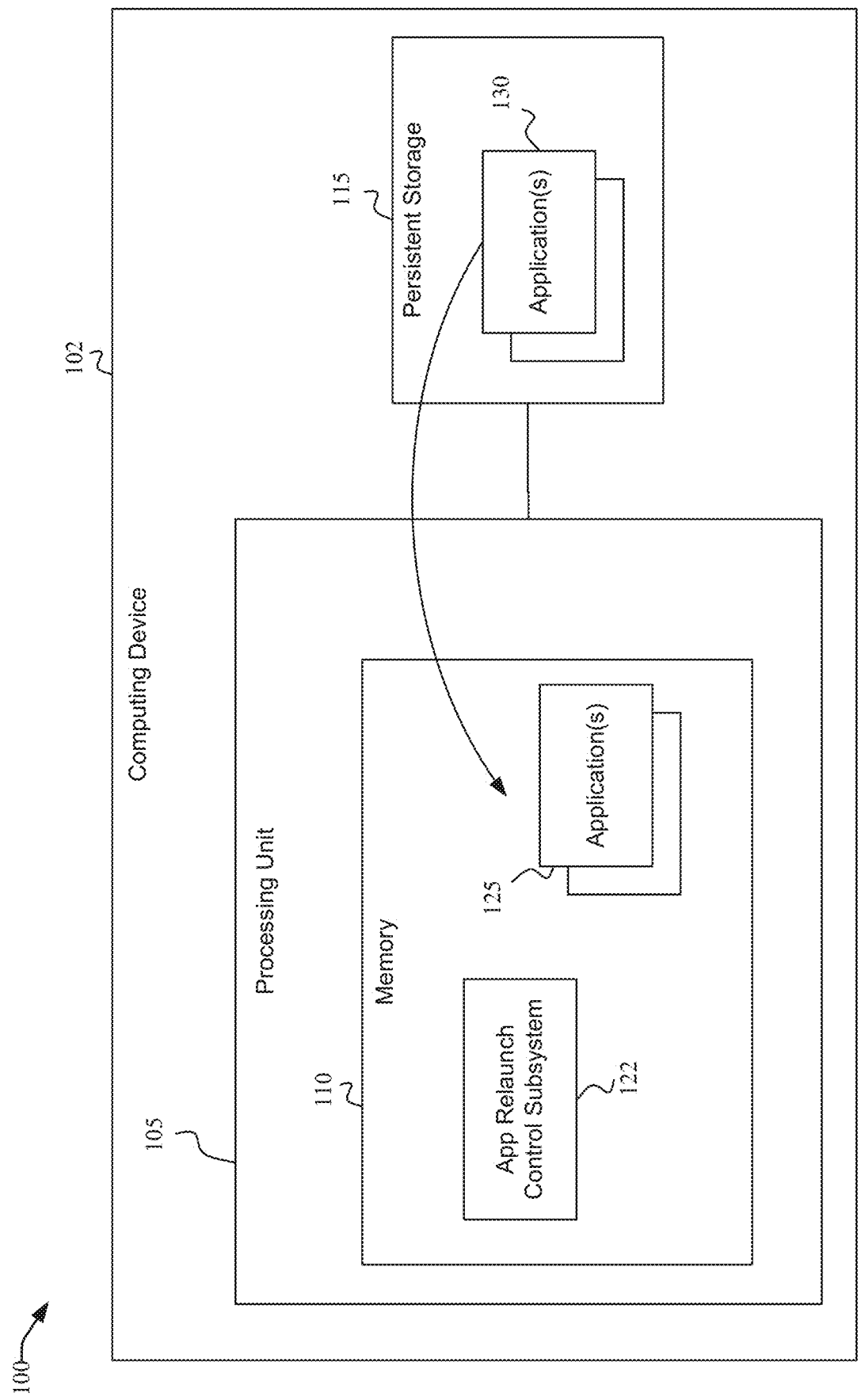
FIG. 1 illustrates an exemplary application relaunch optimization system according to certain aspects of the present disclosure.

Users of computing devices often terminate applications through input to an application management interface. These users terminate applications for various reasons. As one example, the user may terminate applications simply to clean up or simplify the aesthetic appearance of the application management interface. As another example, since it is well known that the amount of memory in mobile computing devices is typically less than that available on notebook or desktop computers, a user of a mobile computing device may terminate applications that have not been recently used in the belief that doing so will improve the device's performance. However, modern operating systems manage applications so efficiently that the performance improvement from terminating applications is typically imperceptible or non-existent. Further, relaunching an application from non-volatile storage in order to use the application again is often slow and computationally inefficient as compared to accessing the same application from a suspended state in volatile memory. Repeated relaunching of applications from persistent storage can also reduce the service life of the storage device when the storage device is based on NAND technology. Thus, a user's habit of periodically terminating applications may actually decrease device performance over time, compromising the user experience.

Methods and systems are disclosed herein for providing application relaunch optimization. These techniques improve overall computing device performance by deferring the termination of at least some applications notwithstanding an action taken by the user to terminate such applications. The termination can be deferred until the occurrence of a trigger event. The techniques can also take user behavior into account. For example, a timer can be set to run, during which the termination will take place if an additional user action occurs, and after which the application will be kept suspended in volatile memory indefinitely. Other factors, such as location, can also be used in setting a trigger event.

In other examples, the termination can take place, or not, depending on the type of application or the nature of its usage. For example, a music application may be terminated, as a user would expect the music to stop playing when the user takes action to terminate the music application. An application that has not been terminated despite the termination action being taken by the user and the application's removal from the application management interface can be invoked quickly and efficiently, improving the overall user experience.

In some examples, a trigger event is set by starting a timer when a termination input is detected for a running or suspended application. In this case, the trigger event is the expiration of the time period for the timer. The termination input may be received, for example, through user input to an application management interface. Terminating the application is deferred. If an input is received to invoke the application again prior to expiration of the timer, the application is terminated and relaunched, since it can be assumed that the termination action was taken either because the user was experiencing a problem with the application, or because the user intended to quickly reset the application to its startup state. Conversely, if the time period for the timer expires, the application will be kept in its suspended state in volatile memory indefinitely, and relaunched from the suspended state when a user next invokes the application. The application will then relaunch faster and more efficiently as compared to launching the application from storage if the application had actually been terminated. The timer may be fixed or variable, for example, set based on a configuration selection or the type of application, or set based on heuristics. In some examples, the application is removed from the application management interface in response to the termination input to provide the expected feedback to the user.

In some examples, an application can be terminated in response to the termination input without setting a timer or other trigger event. For example, if the application was actively being used (in the foreground state) when the termination input is received, it can again be assumed that the termination action was taken either because the user was experiencing a problem with the application, or because the user intended to quickly reset the application to its startup state. In this case the termination action is carried out in response to the input and not deferred. The same assumption may be made depending on a runtime state. For example, if the application is asserting itself to the operating system as being actively used even in the background (a "background assertion"), such as with a music application or GPS-based application, the termination action can be carried out in response to the input and not deferred.

An application may also optionally be terminated in response to the termination input without deferral based on projected relaunch resources for the application. For example, if characteristics of the application are such that a launch from persistent storage is projected to occur quickly, or with minimal disk activity, the use of deferred termination may be skipped and the application will be terminated in response to the user's termination input. In such a case, there is little to be gained by deferring the termination. It may thus be more efficient to not use computing resources that would otherwise be required to manage the deferred termination.

I. Relaunch Optimization System

Figure 2:
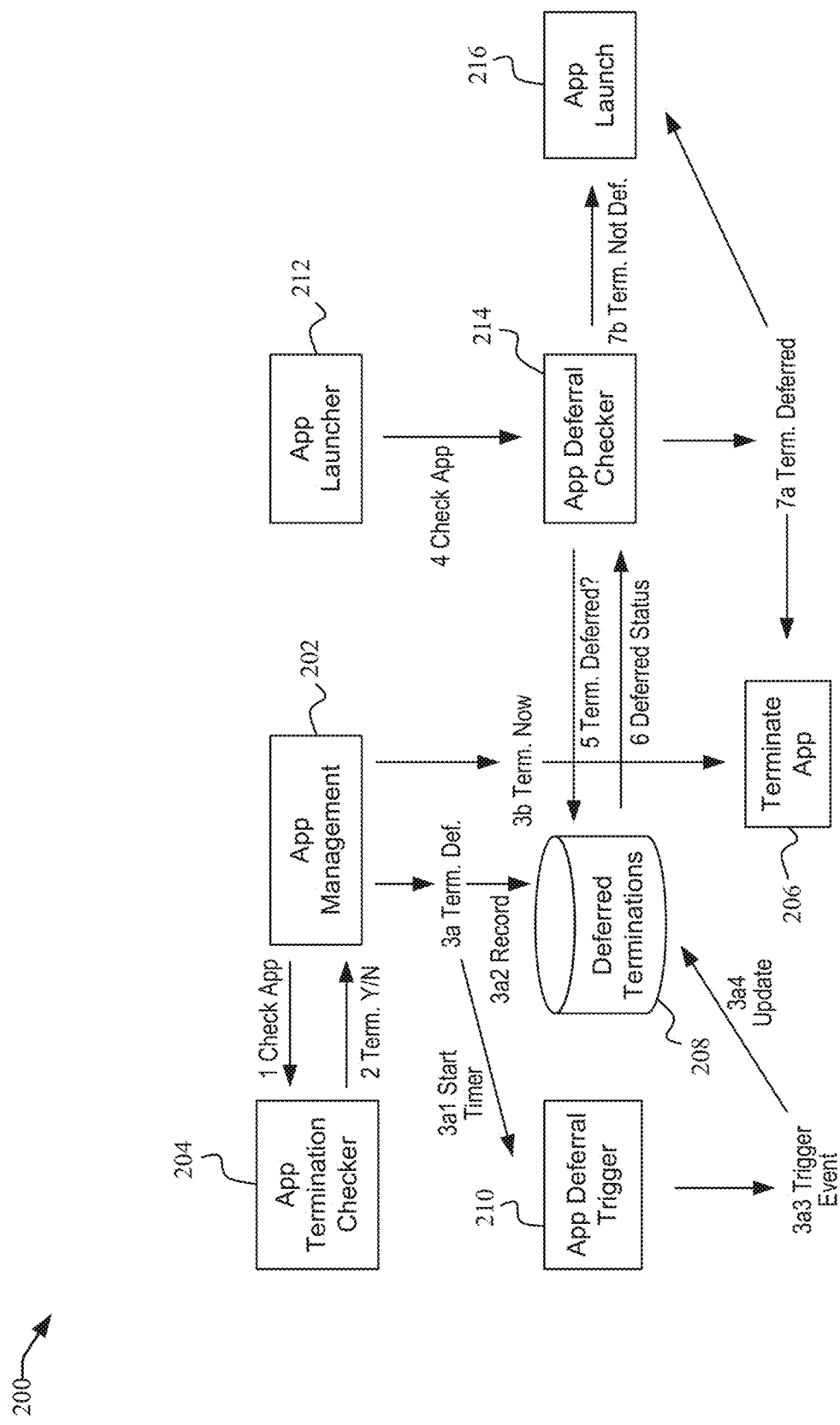
FIG. 2 illustrates an exemplary application relaunch control subsystem architecture for providing relaunch optimization according to certain aspects of the present disclosure.

In exemplary embodiments described below, an example system for application relaunch optimization is shown. FIG. 1 and its description provides an overview of the system and FIG. 2 illustrates the application relaunch control subsystem architecture.

A. System Overview

FIG. 1 depicts a block diagram of a relaunch optimization system 100 for loading of applications from persistent storage into memory of a computing device according to certain embodiments. For purposes of illustration, the computing device 102 can be considered a mobile device, although the relaunch optimization techniques herein can apply to any computing device, including embedded systems, desktop computers, and notebook computers. An application that is not actively in use, that is, in the foreground, may be running in the background, or may be suspended, still loaded into memory, but not presented to a user in the foreground where the user can interact with the application.

In some embodiments, relaunch optimization system 100 includes a processing unit 105 and a persistent storage device 115. Processing unit 105 can potentially include memory 110 and one or more processors (e.g., central processing units) (not shown here) that can execute computer code to perform one or more processes. Memory can, alternatively, or in addition, be separate from and communicatively coupled to processing unit 105. Memory 110 can include one or more applications 125. Processing unit 105 in this example also includes application relaunch control subsystem 122. Application(s) 125 can be one or more computer software applications that can perform tasks or functions, and may be part of the operating system.

Application relaunch control subsystem 122 can also be software running on processing unit 105 that is resident in memory 110 and that can be accessed by one or more processors of processing unit 105. Application relaunch control subsystem 122 can determine information about the characteristics of the various applications on the computing device and determine whether and when to set a trigger event and defer termination of an application when a termination input is received through the application management interface. For example, determinations as to whether the application is in the foreground state, its runtime state, and/or its projected relaunch resources can be made by the application relaunch control subsystem in order to selectively determine if the termination action should be carried out in response to the input and not deferred.

An application bundle contains the code and data (e.g., graphical images) that constitute the application. Remote content (i.e. from the Internet) is not part of the application bundle, but may be cached in storage. When an application is launched, its executable code and data are copied to memory (RAM). Temporary resources such as remote content, dynamic content (e.g., state in a game), and intermediate variables required for the application to function may also be stored in memory. From a user's perspective, moving a previously used application into the foreground for use may be seen as "launching" the application even though the application was suspended and is still resident in RAM.

Applications 130 are shown as stored on a persistent storage device 115. One or more of applications 130 or portions of applications 130 can be loaded from persistent storage device 115 of a mobile device into memory 110. Memory 110 may include one or more memories. In certain embodiments, persistent storage device 115 can be a data storage device such as persistent storage that can retain data after the device is no longer powered. In some embodiments, persistent storage device 115 can be on a same device (e.g., a personal computer, a smartphone, tablet, or wearable device) as where memory 110 is residing. In other embodiments, memory 110 can be residing on one device (e.g., a wearable device such as a smart watch) while persistent storage device 115 can be on another device (e.g., a smart phone). One or more applications 130 on persistent storage device 115 of the other device can be accessible by the first device, for example, through a network (e.g., Bluetooth®, Wi-Fi®).

B. Relaunch Control Subsystem Architecture

FIG. 2 depicts a block diagram of a relaunch control subsystem architecture 200 for managing the termination deferral, termination, and relaunching of applications. A suspended application is one that is not currently being used, that is, an application that is not presented to a user in the foreground where the user can interact with the application and is not running under a background assertion. A background assertion allows an application to be actively running in the background, for example, to play media or track location while the device is in sleep mode or a different application is being presented in the foreground.

Relaunch control subsystem architecture 200 includes application management module 202, which is controlled by the application management interface. A detailed example of an application management interface is discussed below with reference to FIG. 4. When a user takes action to terminate an application using the application management interface, application management module 202 checks to see if the application is already terminated, in which case the application may be removed from the application management interface to provide appropriate user feedback. Otherwise, the application management module 202 may immediately terminate the application under certain circumstances by issuing an application check 1 to the application termination checker 204.

Application termination checker 204 sends a Yes/No response 2 to application management module 202. Application termination checker responds "No" if termination of the application is to be deferred, and application management module 202 issues a termination deferral 3a. Application termination checker 204 responds "Yes" to terminate the application, for example, if the application was actively being used when the termination input is received, or if the application is asserting itself to the operating system as being used in the background. If the application termination checker 204 directs the application management module 202 to terminate the application, the application management module 202 sends notification 3b to the application termination module 206, which terminates the application.

If the application management module 202 defers the termination of the application, the termination notification 3a is forwarded as notification 3a2 to record the deferral in deferred termination database 208. The application, rather than being terminated, is kept suspended in the background. Application deferral trigger 210 is set by notification 3a1 to defer the termination of the application. For example, if a timer is set, application deferral trigger 210 is a timer that is started. If the user relaunches the application before the trigger event, the application will be immediately terminated and launched. Thus, if the user relaunches the application quickly, making it likely that the user terminated the application because something was wrong with its operation or due to a desire to quickly reset the application to its normal startup state, the user experiences the expected results.

The deferred termination database 208 maintains a record of deferred terminations, since in at least some embodiments, the application management interface and hence the application management module 202 will no longer list the application. Once the trigger event (e.g., timer expiration) occurs at 3a3, a notification 3a4 is sent to deferred termination database 208 and a trigger event status flag in the database is updated to indicate that the termination is now deferred indefinitely. In some embodiments, different databases can be used to track the status of an application as either deferred against a timer, a heuristic, or other trigger event, or deferred indefinitely. Once the application's termination is deferred indefinitely, one or more of the application's processes are maintained in some way. In one example, the application is kept suspended in the background. In another example, the application can be "frozen" by writing its operating state and data to persistent storage, as may be supported with some operating systems. In either case, if the application is "relaunched" from the user's perspective, it will resume rather than start from scratch, allowing it to accept input and provide other operations quickly as compared to the application's response if it had actually been terminated.

When a user invokes an application for use, application launcher 212 issues a request 4 to check the status of the application. In response, application deferral checker 214 issues a query 5 to deferred termination database 208 to find out of the application is a deferred application and receives response 6. This response indicates whether the application is in the database and its deferral status, that is, whether its termination is deferred until the trigger event, or deferred indefinitely. If the termination is deferred, notification 7a, depending on whether the trigger event has occurred, either proceeds to application launch module 216 to relaunch the application from its suspended state, or proceeds to application termination module 206 to terminate the application, after which it is automatically relaunched. If the application is not in the database, meaning the application is not subject to a deferred termination, the application deferral checker 214 sends notification 7b to proceed with application launch 216 from persistent storage.

II. Relaunch Optimization Process

Figure 3:
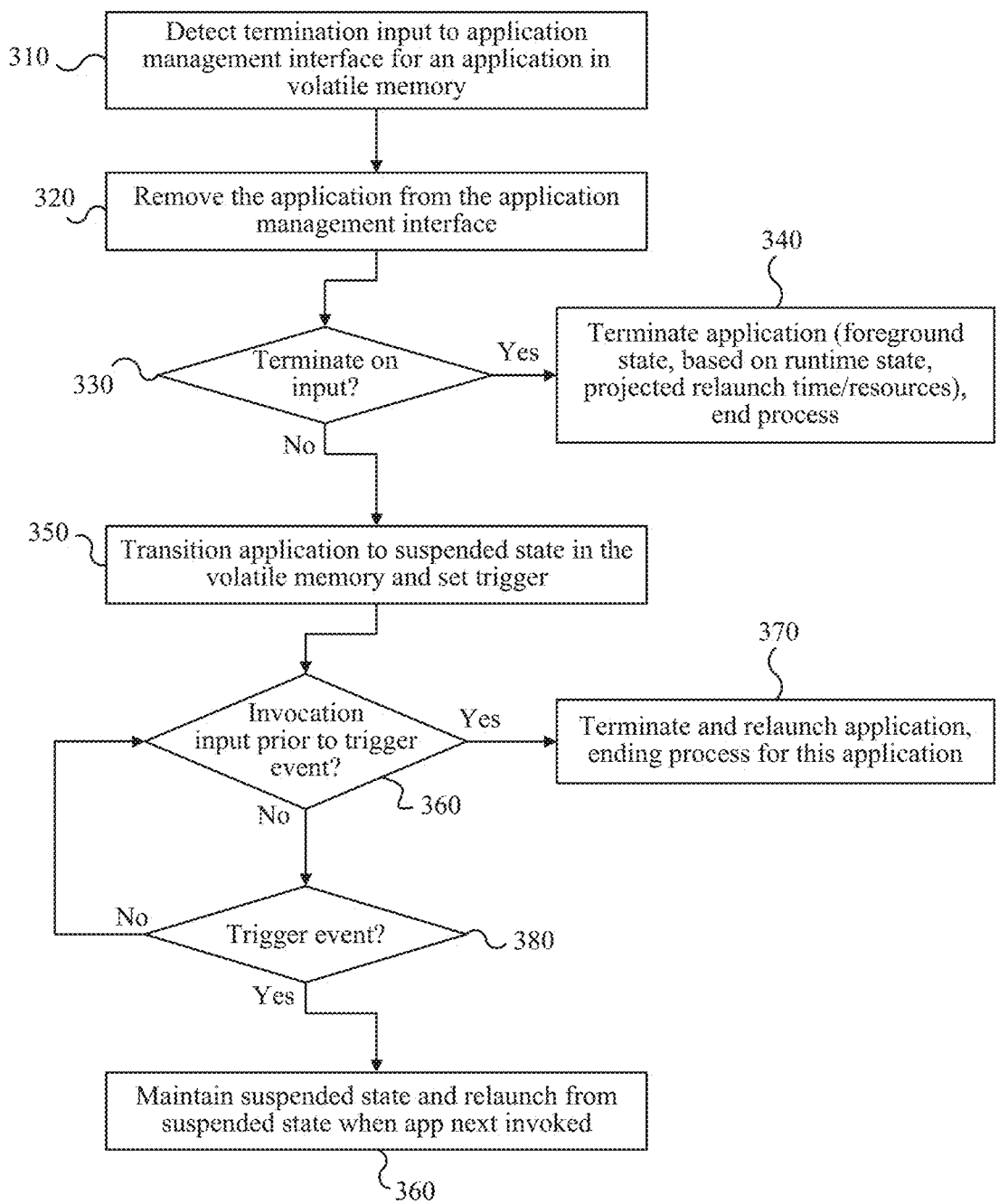
FIG. 3 illustrates an exemplary flowchart of a process for providing application relaunch optimization according to certain aspects of the present disclosure.

The flowchart in FIG. 3 illustrates one example of a launch optimization process 300. In some implementations, one or more process blocks of FIG. 3 may be performed by a system such as system 100 of FIG. 1, a subsystem such as subsystem 200 of FIG. 2, or a computing device such as mobile device 700 discussed below with respect to FIG. 7, using the respective processing unit or processor.

At 310 of FIG. 3, the computing device detects a termination input to the application management interface for an application in volatile memory. The termination input may be the result of a user interacting with the device to terminate the application. As examples, the user may provide termination input by swiping an icon or screen shot away and out of the interface, or by selecting the application from a list of applications and further selecting a "quit" or "force quit" item from a context menu or some other part of the user interface.

At 320, the computing device removes the application from the application management interface irrespective of any delay in terminating the application resulting from a deferred termination. For example, in some implementations, if the application management interface includes a plurality of screenshots of various applications and a user swipes away one of the screenshots to terminate an application, the computing device can eliminate that application's screenshot from the application management interface even if termination of the application is deferred.

At 330, a determination is made by the computing device as to whether the application should be terminated in response to the termination input. The determination to terminate can use one or more conditions (criteria), for example, because the application is the foreground application, is running under a background runtime assertion, or can relaunch with minimal use of time or resources. These conditions can be checked by the application termination checker 204 as shown in FIG. 2.

At 340, if so, the computing device terminates the application in response to one or more of the conditions being satisfied.

At 350, if one or more of the conditions are not satisfied, the computing device sets the trigger event while maintaining the application in a suspended state in volatile memory. The trigger event in some implementations can be an application deferral timer. The time period can, as examples, be fixed, or variable based on heuristics, a configuration option of the operating system of the computing device, or other factors.

The trigger event can be set based on factors other than time. For example, the trigger event can be based on location, for example, the computing device moving to a certain location or moving a certain distance, generally or over a period of time (i.e., at a certain velocity), relative to its location when the termination input was provided. Such location information may indicate, as examples, that the user is driving, exercising, or running, in which case an invocation of the suspended application in the near future is unlikely. Computing device location can be determined, as examples, using GPS capability, cellular network positioning, or Wi-Fi positioning technology. Multiple trigger events can be used. For example, combination of a timer and another non-time-based trigger mechanism can be used. Heuristics or machine learning can be used to set any or all of these trigger events. For example, the duration for the timer can be set based on heuristics from data gathered for the type of computing device involved or from studies of historical user input behavior. A machine learning model can be used, wherein the model is trained using such data. The use of timers, heuristically set or otherwise, or the use of other heuristics or machine learning to set trigger events provides a way to gauge a user's likely intent. Thus, some alternatives for setting trigger events may include accumulated information from a specific user's behavior, for example, on-device usage analytics collected over time.

A number of different heuristics, as examples, can be used to establish the time period for the timer, the expiration of which can serve as a trigger event. An optimized battery charging system for the computing device can set a charge-to-full deferral timer using historical wake-up and unplug patterns. The timer can also be connected with messaging, for example, a timer that produces a second alert a certain amount of time after a first alert is provided for the receipt of a text or other message on the computing device. The timer can be tied to a time threshold set to turn off a display due to inactivity (which can be estimated using biometric authentication). The timer can also be tied to the automatic reestablishment of a Wi-Fi or other network connection after a user disables the relevant connectivity for the device.

Additional actions can be taken based on a time-based trigger event. For example, file and app icons can be intelligently grouped and placed into an "infrequently used" folder if time-since-last-use exceeds the time period. Apps and photos can be off-loaded from persistent storage in or on the computing device to cloud storage if time-since-last-use exceeds the time period.

Non-time-based heuristics can also be used to establish a trigger event. As one example, a low-power mode may automatically turn off once a rechargeable battery for the computing device reaches a certain level of charge, for example, 80%. The occurrence of this event can be used as a time after which an application will remain in a suspended state, since ample power is now available to start trading off power savings for improved performance and/or improved user experience. On some computing devices, biometric identification such as that based on fingerprint or facial recognition becomes disabled after a certain number of attempts to access the computing device. The automatic disabling of biometric access to the computing device can be used as a trigger event. Two or more of the heuristics listed above, both time-based and non-time-based, can optionally be combined and used together.

At 360, the computing device monitors for an invocation input prior to the trigger event. An invocation input is an input intended to "invoke" the application. Such an input launches the application from storage if necessary, or resumes ("relaunches") the application if it has been suspended. If the invocation input is detected at block 360, the computing device terminates and relaunches the application at block 370, ending process 300 for the application. Termination and relaunch can be carried out by the application termination and application launch modules as shown in FIG. 2.

The computing device monitors for the trigger event at 380. Once the trigger event occurs, the application is maintained in a suspended state and relaunched from that suspended state when the application is next invoked. In some implementations, when an application is invoked, the computing device determines the Application's deferral status using the application deferral check and differed termination database as shown in FIG. 2 prior to taking action with respect to the application.

III. Exemplary Relaunch Optimization Implementation

The sections below describe an example implementation of relaunch optimization for applications that are managed using an application management interface. The trigger event in this example is the expiration of a timer set to 30 seconds.

Figure 4:
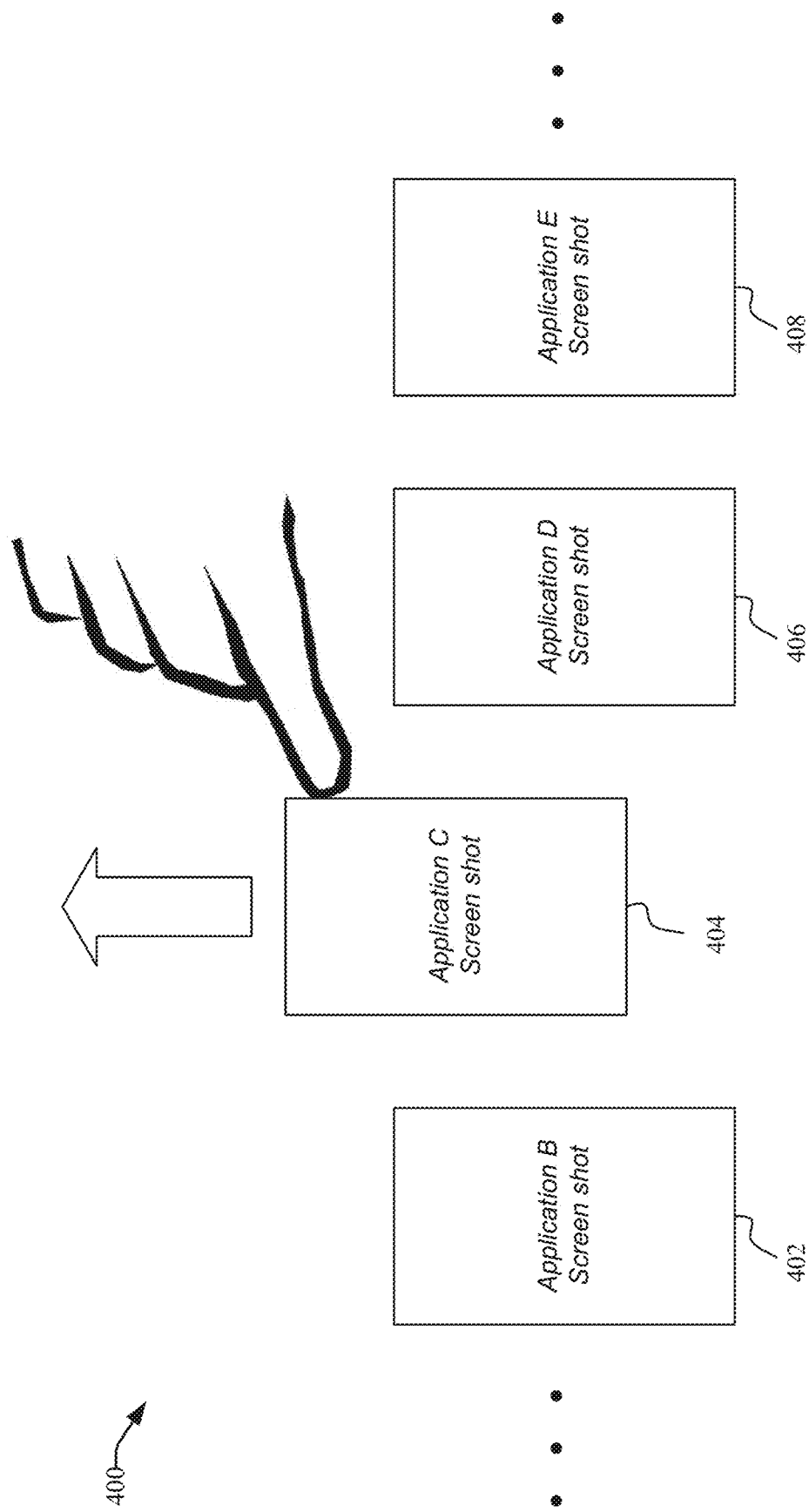
FIG. 4 illustrates an exemplary application management interface that includes application relaunch optimization according to certain aspects of the present disclosure.
Figure 5:
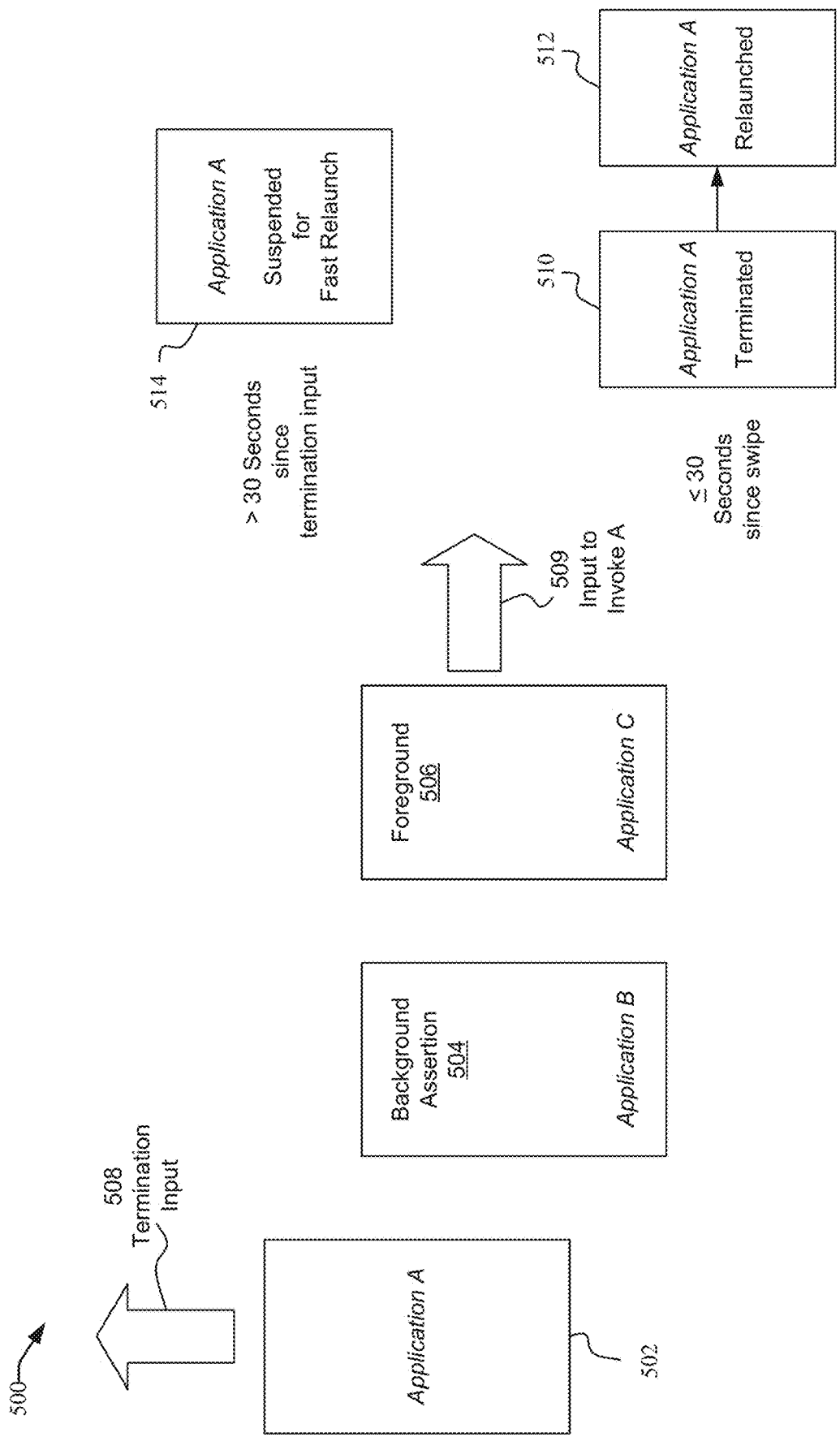
FIG. 5 illustrates exemplary relaunch states for applications subject to relaunch optimization using an exemplary application management interface according to certain aspects of the present disclosure.
Figure 6:
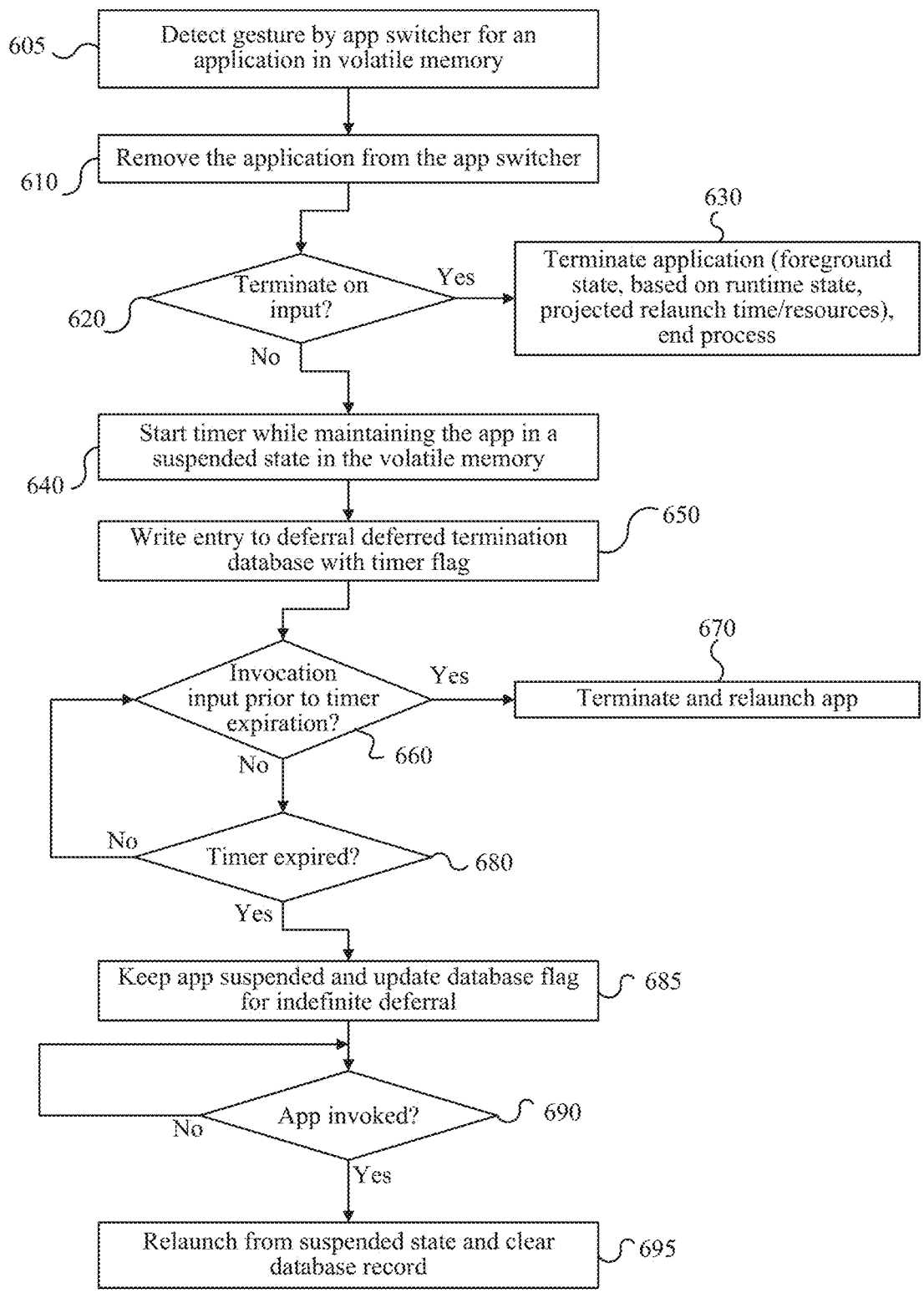
FIG. 6 illustrates another exemplary flowchart of a process for providing application relaunch optimization according to certain aspects of the present disclosure.

FIG. 4, discussed in the first section, describes a graphical implementation of an application management interface, or "app switcher." FIG. 5, discussed in the next section illustrates the various possible states of an application when relaunch optimization is carried out for applications managed using the interface of FIG. 4. FIG. 6 is an example flowchart for the exemplary implementation using the interface of FIG. 4 and the application relaunch control subsystem shown and discussed with respect to FIG. 2. FIG. 6 is discussed in the third section below.

A. Application Management Interface

FIG. 4 illustrates an exemplary application management interface 400 that includes application relaunch optimization according to certain aspects of the present disclosure. Such an interface may be provided by a system such as system 100 of FIG. 1, or a computing device such as mobile device 700 discussed below with respect to FIG. 7, using the respective processing unit or processor. Application management interface 400 is a graphical application management interface, sometimes referred to as an "app switcher." The interface provides a presentation in which each recently-used application is represented by a screenshot captured when the application was in the foreground. In this example, the screenshots appear linearly in a browsable display. However, similar interfaces may be formatted in other ways, for example with screenshots in multiple rows. Similar interfaces may also use icons as opposed to screenshots to represent applications.

In this example, application B screenshot 402, application C screenshot 404, application D screenshot 406, and application E screenshot 408, are visible. A user may swipe left or right to see additional application screenshots, as only a few are visible on the screen at a time in order to provide appropriate sizing for viewing.

The termination input using application management interface 400 is illustrated for screenshot 404. In this instance, the user swipes screenshot 404 upwards, in the direction of the arrow, to provide input to "terminate" an application that may be running or has been recently running and may still be residing in volatile storage. However, in certain implementations described herein, the termination input provided relative to screenshot 404 may not terminate the corresponding application, but may instead create a deferred termination as described thus far with respect to FIG. 2 and FIG. 3.

An application management interface can take many forms, including one that lists names of applications as opposed to presenting graphical representations of applications. An interface that lists applications may require clicking or touching to access a context menu to provide termination input. Alternatively, an application management interface may take the form of a context menu or portion of a context menu that is invoked when the user clicks or touches an icon or a part of a screen that is associated with an application.

B. Application Relaunch States

A relaunch state for purposes of this description is the disposition of the application relative to how it is, or will be, launched if invoked after the application is the subject of a termination input. For example, the relaunch state of an application may indicate that the application is indefinitely suspended in volatile memory, or that it will be terminated rather than suspended due to a runtime assertion or some other consideration.

FIG. 5 illustrates exemplary relaunch states 500 for application relaunch optimization using an exemplary application management interface according to certain aspects of the present disclosure. Such application relaunch states may be provided by a system such as system 100 of FIG. 1, a subsystem such as subsystem 200 of FIG. 2, or a computing device such as mobile device 700 discussed below with respect to FIG. 7, using the respective processing unit or processor and the application management interface of FIG. 4.

Relaunch states 500 includes three applications that are generally active, or at least quickly accessible (e.g., in a suspended state) from volatile memory of the computing device. Application A is in a background state 502 and application B is active under a specific runtime assertion, a background assertion state 504. Therefore, in example implementations, if the user moves to terminate application B, the computing device will terminate the application immediately as a background assertion state suggests that the application is doing some tasks that is perceptible to the user. The user would therefore expect that task to stop when the user "terminates" the application. For example, application B may be playing audio or tracking the computing device's location.

Application C is running in a foreground state 506 (or at least was running in the foreground state prior to the application management interface being activated). Application C is currently in active use by the user of the computing device. If the user were to provide termination input for application C, the computing device will terminate application C immediately, since it can be assumed that the user seeks to actually terminate the application. For example, the user may wish to terminate the application due to a problem such as the application being hung and unresponsive. Alternatively, the user may wish to terminate the application due to a desire to quickly change the application to its startup condition with respect to menu choices, data that is loaded, etc.

If the user provides termination input to any application, that application will be removed from the application management interface. In example implementations, other applications (not shown) may be presented in the application management interface (e.g., application management interface 400) but not be running or suspended. Such applications are accessible only by launching from storage, and are shown in the interface only because the applications were recently used. If the user provides termination input for one of those applications, the application will be removed from the application management interface, but none of the other actions described herein will take place.

Assuming the user provides termination input 508 for application A, for example, by swiping up in the direction of the arrow as previously discussed with respect to FIG. 4, the computing device can suspend, rather than terminate, the application and prepares to respond to a trigger event. The computing device can remove application A from the application management interface. In this implementation, the trigger event is the expiration of a timer. The timer in this example is set for a duration of 30 seconds, but other example durations include 45 seconds, one minute, two minutes, etc. The timer may be set to varying durations based on heuristics, the specific application, or configuration options chosen by the user.

The next states that occur for application A are selectively determined based on the timer. For example, if the user provides an input 509 to invoke the application within the timer's duration, in this example, within or equal to 30 seconds after the user provided termination input by swiping up, application A is terminated and relaunched, moving through termination state 510 and relaunch state 512. These states may be implemented by the application termination and application launch modules as shown in FIG. 2. If the timer expires in 30 seconds, application A moves to state 514, a state of being indefinitely suspended and waiting for relaunch.

State 514 may last indefinitely. State 514 will end with the application being completely terminated such that in can only be invoked by launching from storage when any of certain device-based events occur. For example, the application will terminate when the computing device is rebooted, or when application A is updated or reinstalled. During state 514, application A remains absent from the application management interface.

C. Application Relaunch Management Process

FIG. 6 illustrates an example process of relaunch optimization for applications that are managed using an application management interface like that shown in FIG. 4. The trigger event in this example is the expiration of a timer set when a termination input is received. The process makes use of a deferred termination database such as database 208.

FIG. 6 illustrates an exemplary flowchart of a process 600 for providing application relaunch optimization using an application management interface, the "app switcher" described with respect to FIG. 4 according to certain aspects of the present disclosure. Such an interface may be provided by a system such as system 100 of FIG. 1, or a computing device such as mobile device 700 discussed below with respect to FIG. 7, using the respective processing unit or processor.

At 605, the computing device detects a termination input gesture through the app switcher for an application in volatile memory, similar to 310 of FIG. 3.

At 610, the application is removed from the app switcher, similar to 320 of FIG. 3.

At 620, the computing device determines if the application should be terminated in response to the termination input, without setting a timer. If so, the application is terminated at 630. These operations are similar to 320 and 330 of FIG. 3. As examples, the application may be terminated or not (selectively terminated) based on the determination at 620 of any of its foreground state, its runtime state, its projected launch time or its projected resource usage. At 640, assuming the application was not terminated based on a determination at 620, the computing device starts the timer while maintaining the application in a suspended state in volatile memory.

The termination of an application based on its status as a foreground application or one running a background assertion is optional, as is termination based on the application's use of minimal resources to relaunch. Optionally, all applications can be managed by starting the timer or setting another trigger event to make determinations as to managing the application.

In some implementations, the timer is set to a fixed value of 30 seconds. Some analytics suggest that if a user does not invoke an application again within that time period, the user likely terminated the application without the intent to invoke the application until the user is ready to make active use of the application again.

At 650, the computing device writes an entry for the application to the deferred termination database. A trigger event status flag is set to indicate that the timer is running for the application. At 660, the computing device monitors for an invocation input prior to the expiration of the timer. In this example, the computing device waits to determine if a user invokes the application for use prior to the expiration of the time period set by the timer. If so, the application is terminated and relaunched at 670, similar to 370 of FIG. 3. Otherwise, the computing device waits for the timer to expire at 680.

When the timer expires, at 685, the computing device will keep the application suspended, and update the trigger event status flag in the database to indicate that the termination of the application has been deferred indefinitely. The deferral termination database is maintained so that processes within the computing device can keep track of the status of the application, since the application is no longer present in the application management interface, as might be the case without the implementations described herein. If the application is invoked at 690, the computing device relaunches the application from its suspended state and clears the database record at 695.

By managing the relaunch of applications according to the implementations described herein, overall performance can be improved, and wear and tear on some persistent storage devices, such as NAND-based flash, can be reduced. Some data suggests that a typical user of a mobile computing device only revisits an application after intentionally terminating it about 10% to 15% of the time. Thus, if such data is accurate for a given device, 85% to 90% of application launch times can be improved when the application is kept suspended until relaunch, enhancing the overall efficiency of use and the user experience.

IV. Exemplary Computing Devices

Figure 7:
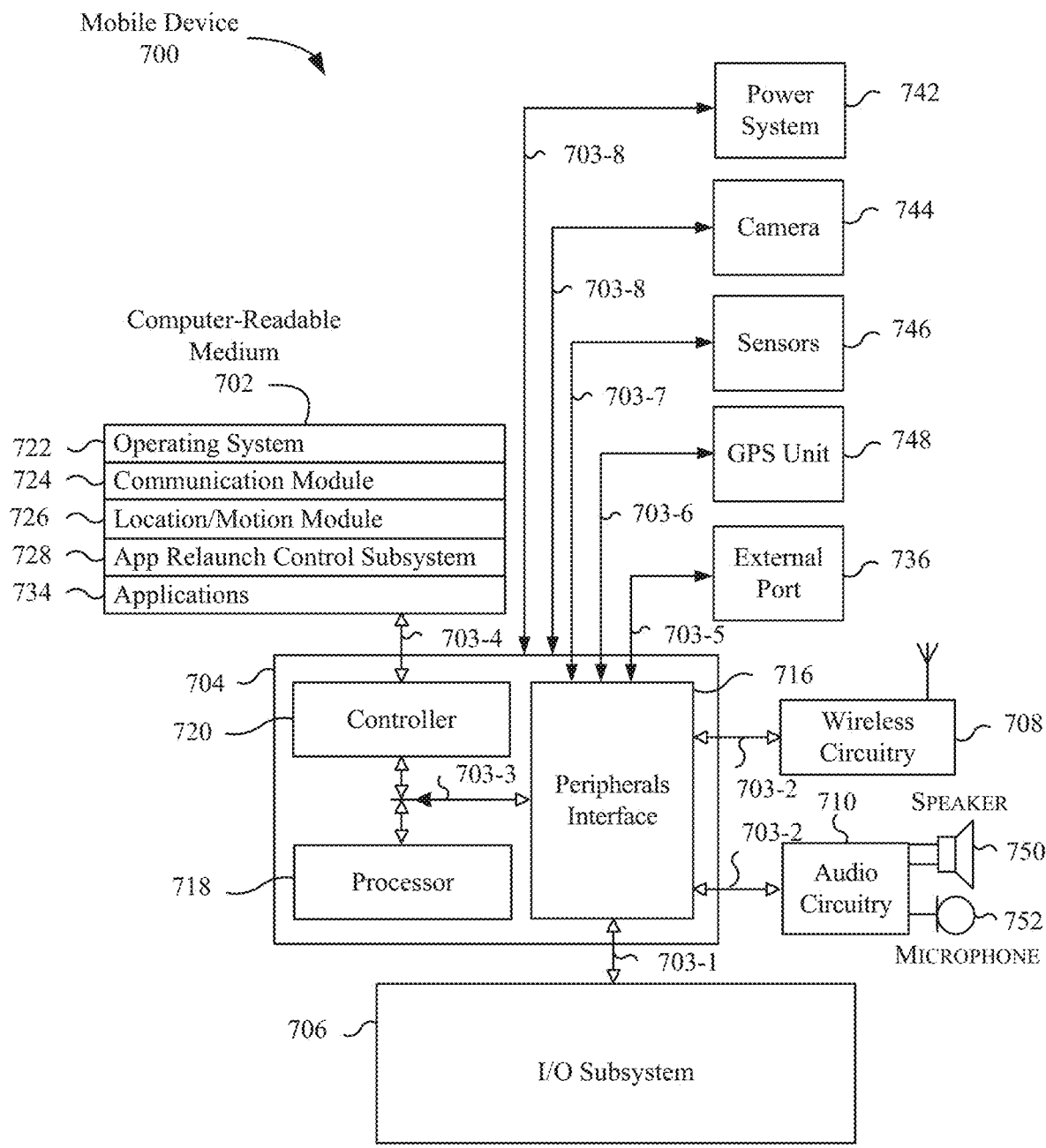
FIG. 7 is a block diagram for an exemplary computing device according to certain aspects of the present disclosure.

FIG. 7 is a block diagram of an example device 700, which may be a mobile device. Device 700 generally includes computer-readable medium 702, a processing system 704, an Input/Output (I/O) subsystem 706, wireless circuitry 708, and audio circuitry 710 including speaker 750 and microphone 752. These components may be coupled by one or more communication buses or signal lines 703. Device 700 can be any electronic device, including a handheld computer, a tablet computer, a mobile phone, laptop computer, desktop computer, embedded system, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 708 can use various protocols, e.g., as described herein.

Wireless circuitry 708 is coupled to processing system 704 via peripherals interface 716. Peripherals interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats for one or more application programs 734 stored on medium 702.

Peripherals interface 716 couple the input and output peripherals of the device to processor 718 and computer-readable medium 702. One or more processors 718 communicate with computer-readable medium 702 via a controller 720. Computer-readable medium 702 can be any device or medium that can store code and/or data for use by one or more processors 718. Medium 702 can include a memory hierarchy, including cache, main memory and secondary memory.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes a camera 744. In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some embodiments, device 700 can include a GPS receiver, sometimes referred to as a GPS unit 748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for device 700. In some embodiments, the software components include an operating system 722, a communication module (or set of instructions) 724, a location module (or set of instructions) 726, a relaunch control subsystem 728, and other applications (or set of instructions) 734.

Operating system 722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., USB, FireWire, Lightning connector, 60-pin connector, etc.) is adapted for coupling directly to other devices or indirectly over a network (e.g., the Internet, wireless LAN, etc.).

Location/motion module 726 can assist in determining the current position (e.g., coordinates or other geographic location identifier) and motion of device 700. This information can in some implementations be used to set a trigger event as described herein. Modern positioning systems include satellite based positioning systems, such as Global Positioning System (GPS), cellular network positioning based on "cell IDs," and Wi-Fi positioning technology based on a Wi-Fi network. GPS also relies on the visibility of multiple satellites to determine a position estimate, which may not be visible (or have weak signals) indoors or in "urban canyons." In some embodiments, location/motion module 726 receives data from GPS unit 748 and analyzes the signals to determine the current position of the mobile device. In some embodiments, location/motion module 726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 708 and is passed to location/motion module 726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 700 based on the position coordinates of the corresponding transmitters. Regardless of the specific location technology used, location/motion module 726 receives information from which a location fix can be derived, interprets that information, and returns location information, such as geographic coordinates, latitude/longitude, or other location fix data.

Application relaunch control subsystem 728 includes modules such as those described with respect to FIG. 2, for example, those that implement application management, application deferral checking, application termination checking, application deferral triggers, and the deferred termination database. These modules are used to implement embodiments described herein. A module may include a current state and an agent implementing actions and control policies based on a trigger event, a foreground state of an application, a runtime state of the application, projected relaunch resources for the application or, any combination of the foregoing. For example, the current state may include an indefinitely deferred state, a foreground state, or a background assertion state. Upon a change, the agent determines the next action.

The one or more applications 734 on the mobile device can include any applications installed on the device 700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a timer module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The timer module can maintain various timers for any number of events, including a timer that is set to the time duration during which an application will be terminated and relaunched if a user invokes the application after providing a termination input.

The I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or track pad. In some embodiments, I/O subsystem 706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

What is claimed is:

1. A method comprising performing, by one or more processors of a computing device:

detecting a first termination input for a first application in volatile memory and a second termination input for a second application in the volatile memory;

transitioning the first application and the second application to a suspended state in the volatile memory in response to the first termination input and the second terminal input, respectively;

storing, in response to transitioning the first application and the second application to the suspended state, a first record and a second record of a deferred termination;

terminating and automatically relaunching the first application, in response to a first invocation input for the first application occurring prior to a trigger event;

activating the second application from the suspended state in response to a second invocation input for the second application occurring after the trigger event; and clearing the second record of the deferred termination in response to activating the second application from the suspended state.

2. The method of claim 1, further comprising, for each application, terminating the application in response to the termination input based on whether the application was, before the termination input, in a foreground state, a runtime state of the application, projected relaunch resources for the application, or any combination of the foregoing.

3. The method of claim 1, wherein the record of the deferred termination includes a trigger event status flag, the method further comprising updating the trigger event status flag based on the trigger event.

4. The method of claim 1, further comprising maintaining the application in the suspended state until an invocation of the application occurs after the trigger event.

5. The method of claim 1, further comprising starting a timer in response to detecting the termination input, wherein the trigger event comprises expiration of a time period for the timer.

6. The method of claim 5, further comprising heuristically setting the time period for the timer based on historical data from user inputs.

7. The method of claim 1, further comprising removing the application from an application management interface in response to the termination input, irrespective of any delay in terminating the application.

8. The method of claim 7, wherein the application management interface comprises a plurality of application icons or screenshots in a browsable display.

9. The method of claim 1, further comprising setting the trigger event based on a location of the computing device.

10. A non-transitory computer-readable medium storing a plurality of instructions that, when executed by one or more processors of a computing device, causes the one or more processors to:
detect a termination input for an application in volatile memory;
transition the application to a suspended state in the volatile memory in response to the termination input;
store, in response to transitioning the application to a suspended state, a record of a deferred termination;
selectively terminate and automatically relaunch the application, both based on an invocation input for the application occurring prior to a trigger event;
selectively activate the application from the suspended state based on the invocation input occurring after the trigger event; and
clear the record of the deferred termination in response to activating the application from the suspended state.

11. The non-transitory computer-readable medium of claim 10, the instructions further causing the one or more processors to selectively terminate the application in response to the termination input based on whether the application was, before the termination input, in a foreground state, a runtime state of the application, projected relaunch resources for the application, or any combination of the foregoing.

12. The non-transitory computer-readable medium of claim 10, wherein the record of the deferred termination includes a trigger event status flag, the instructions further causing the one or more processors to update the trigger event status flag based on the trigger event.

13. The non-transitory computer-readable medium of claim 10, the instructions further causing the one or more processors to maintain the application in the suspended state until an invocation of the application occurs after the trigger event.

14. The non-transitory computer-readable medium of claim 10, wherein the trigger event comprises at least one of expiration of a time period for a timer or a location of the computing device.

15. A computing device comprising:
one or more memories; and
one or more processors communicatively coupled to the one or more memories and configured to execute instructions stored in the one or more memories for performing operations of:
detecting a termination input for an application in volatile memory;
transitioning the application to a suspended state in the volatile memory in response to the termination input;
storing, in response to transitioning the application to a suspended state, a record of a deferred termination;
selectively terminating and automatically relaunching the application, both based on an invocation input for the application occurring prior to a trigger event;
selectively activating the application from the suspended state based on the invocation input occurring after the trigger event; and
clearing the record of the deferred termination in response to activating the application from the suspended state.

16. The computing device of claim 15, the one or more processors configured to execute instructions for performing the operation of selectively terminating the application in response to the termination input based on whether the application was, before the termination input, in a foreground state, a runtime state of the application, projected relaunch resources for the application, or any combination of the foregoing.

17. The computing device of claim 15, wherein the record of the deferred termination includes a trigger event status flag, the one or more processors configured to execute instructions for performing the operation of updating the trigger event status flag based on the trigger event.

18. The computing device of claim 15, the one or more processors configured to execute instructions for performing an operation of maintaining the application in the suspended state until an invocation of the application occurs after the trigger event.

19. The computing device of claim 15, the one or more processors configured to execute instructions for performing an operation of starting a timer in response to detecting the termination input, wherein the trigger event comprises expiration of a heuristically set time period for the timer.

20. The computing device of claim 15, the one or more processors configured to execute instructions for performing an operation of removing the application from an application management interface in response to the termination input, irrespective of any delay in terminating the application, wherein the application management interface comprises a plurality of application icons or screenshots in a browsable display.

* * * * *